(12) United States Patent
Furuta et al.

(10) Patent No.: US 7,350,054 B2
(45) Date of Patent: Mar. 25, 2008

(54) PROCESSOR HAVING ARRAY OF PROCESSING ELEMENTS WHOSE INDIVIDUAL OPERATIONS AND MUTUAL CONNECTIONS ARE VARIABLE

(75) Inventors: Koichiro Furuta, Tokyo (JP); Taro Fujii, Tokyo (JP); Masato Motomura, Tokyo (JP)

(73) Assignee: NEC Corporation, Tokyo (JP)

( * ) Notice: Subject to any disclaimer, the term of this patent is extended or adjusted under 35 U.S.C. 154(b) by 433 days.

(21) Appl. No.: 10/225,194

(22) Filed: Aug. 22, 2002

(65) Prior Publication Data

US 2003/0046513 A1    Mar. 6, 2003

(30) Foreign Application Priority Data

Aug. 31, 2001  (JP) ............................. 2001-263804

(51) Int. Cl.
*G06F 15/76*  (2006.01)
(52) U.S. Cl. ...................................................... 712/15
(58) Field of Classification Search ................ 712/21, 712/20, 10, 11
See application file for complete search history.

(56) References Cited

U.S. PATENT DOCUMENTS 5,148,547 A * 9/1992 Kahle et al. .................. 712/22
5,475,856 A * 12/1995 Kogge .......................... 712/20
5,638,525 A * 6/1997 Hammond et al. ......... 712/209
6,560,694 B1 * 5/2003 McGrath et al. ............ 712/210
2001/0018733 A1    8/2001 Fujii et al.

FOREIGN PATENT DOCUMENTS

| JP | 59-62951 | 4/1984 |
| JP | 1-147767 | 6/1989 |
| JP | 2001-312481 | 11/2001 |

OTHER PUBLICATIONS

Bedard et al. The Weitek 64-bit Floating-Point Datapath Unit. Maple Press, 1988.*
Hennessy and Patterson. Computer Organization and Design. Morgan-Kaufmann Publishers Inc., 1998. pp. 225-227.*

* cited by examiner

*Primary Examiner*—Richard L. Ellis
*Assistant Examiner*—Jacob Petranek
(74) *Attorney, Agent, or Firm*—Foley & Lardner LLP

(57) ABSTRACT

An arrayed processor has a plurality of processing elements each having a plurality of types of arithmetic logic units for processing data having different numbers of bits from one another. The arrayed processor divides a series of processing data of various numbers of bits supplied from an external circuit into data of more bits and data of fewer bits. These data are processed in parallel by the arithmetic logic units of the processing elements. The efficiency of arrayed processor can be increased, since small-scale processing operations are individually performed by the processing elements and connections between the processing elements are made according to object codes.

16 Claims, 18 Drawing Sheets

PROCESSOR HAVING ARRAY OF PROCESSING ELEMENTS WHOSE INDIVIDUAL OPERATIONS AND MUTUAL CONNECTIONS ARE VARIABLE

BACKGROUND OF THE INVENTION

1. Field of the Invention

The present invention relates to a processor for executing various arithmetic operations, and more particularly to an arrayed processor comprising an array of processing elements whose individual operations and mutual connections are variable.

2. Description of the Related Art

At present, products called CPU (Central Processing Unit) and MPU (Micro Processor Unit) are used in the art as processor units capable of performing various data processing processes.

In a data processing system using such a processor unit, a plurality of application programs in which a plurality of instruction codes are described and various processing data are stored in a memory device, and the processor unit sequentially reads instruction codes and processing data from the memory device and successively carries out a plurality of processing tasks.

While a solo processor unit can perform various data processing processes, the processor unit needs to successively carry out a plurality of processing tasks. Since the processor unit is required to read instruction codes from the memory device in each of the processing tasks, it is difficult for the processor unit to perform complex data processing operations at a high speed.

If only one data processing task is required to be performed, then a logic circuit may be hardware-implemented to carry out such one data processing task. With such a logic circuit used, a processor unit is not needed to sequentially read a plurality of instruction codes from a memory device and successively carry out a plurality of processing operations. Therefore, it is possible to perform a complex data processing task at a high speed. However, only one data processing task can be carried out at a high speed.

In summary, a data processing system capable of switching between application programs can perform various data processing processes, but finds it difficult to perform data processing operations at a high speed because the data processing system has a fixed hardware arrangement. A hardware-implemented logic circuit is capable of carrying out data processing processes at a high speed, but can perform only one data processing task as its application program cannot be changed.

To solve the above problems, the applicant has devised an arrayed processor as a processor unit whose hardware arrangement changes depending on the software to be executed, and filed Japanese patent application No. 2000-043202 for such an arrayed processor.

Japanese patent application No. 2000-043202 was not laid open at the time the Japanese application corresponding to the present U.S. patent application was filed, it does not constitute known prior art for the present application, but constitute unknown related art for the present application.

The arrayed processor disclosed in Japanese patent application No. 2000-043202 comprises a matrix of small-scale arithmetic logic units whose individual operations and mutual connections are variable depending on a plurality of instruction codes sequentially described in application programs.

Therefore, when an application program changes to another application program, the hardware arrangement of the arrayed processor changes, allowing the arrayed processor to perform various data processing processes. The arrayed processor can carry out data processing tasks at a high speed because a number of small-scale processing elements as hardware elements carry out simple processing operations in parallel.

While the arrayed processor can carry out various data processing tasks at a high speed, some capability of the arrayed processor may be wasted depending on application programs and processing data.

For example, if an arrayed processor comprises a matrix of arithmetic logic units each for carrying out 8-bit processing processes, then it can perform processing tasks most efficiently when processing data are of 8 bits, but some of the processing capability of the arithmetic logic units is wasted when processing data are of 4 or 2 bits.

One solution to the above problem would be to construct an arrayed processor of a number of arithmetic logic units each carrying out 1-bit processing processes. However, if processing data are of a plurality of bits, then since a number of arithmetic logic units need to be used, the processing capability of the arrayed processor would be lowered in most data processing applications.

SUMMARY OF THE INVENTION

It is therefore an object of the present invention to provide an arrayed processor capable of carrying out processing processes with high efficiency even if the number of bits of processing data is changed in various ways.

An arrayed processor according to the present invention comprises a plurality of processing elements arranged in a matrix, together with a plurality of switch elements, in parallel to a solo state transition controller. Each of the processing elements has an instruction memory, an instruction decoder, and arithmetic logic units. Specifically, each of the processing elements includes a plurality of types of arithmetic logic units for processing data having different numbers of bits from one another.

The state transition controller generates instruction pointers for the processing elements in response to object codes supplied thereto from an external circuit and supplies the generated instruction pointers to the respective processing elements to designate one of a plurality of instruction codes stored in each the instruction memory. The instruction decoder decodes the designated instruction codes to control processing operation of the arithmetic logic units and also control connections of the processing elements by the switch elements. The processing elements thus controlled process a series of processing data input thereto from an external circuit, each of the processing elements including a plurality of types of arithmetic logic units for processing data having different numbers of bits from one another.

The arrayed processor can process in parallel data having different numbers of bits in each of the processing elements according to object codes. For example, the arrayed processor can divide a series of processing data of various numbers of bits supplied from an external circuit into data of more bits and data of fewer bits, and hence can process data with high efficiency even if the number of bits of processing data is changed in various ways.

The arrayed processing elements includes a solo data distributor connected in parallel to the processing elements, for dividing a series of processing data input from an external source into mb (m-(bit): "m" represents a natural number equal to or greater than 2) data and nb (n-(bit): "n" represents a natural number smaller than "m") data. Each of the processing elements has an mb arithmetic logic unit and an nb arithmetic unit for processing the mb data and the nb data, respectively. Therefore, the arrayed processor can divide a series of processing data into mb data of more bits and nb data of fewer bits, and can process the mb data and nb data in parallel.

The arrayed processor further includes mb buses for transmitting the mb data and nb buses for transmitting the nb data, the mb buses, the nb buses, and the switch elements being arranged in a matrix, each of the switch elements having a bus connector, an input control circuit, and an output control circuit. The bus connectors control connections between the mb buses connected thereto and connections between the nb buses connected thereto. The input control circuits control at least connections of input data from the mb buses to the mb arithmetic logic units and connections of input data from the nb buses to the nb arithmetic logic units. The output control circuits control at least connections of output data from the mb arithmetic logic units to the mb buses and connections of output data from the nb arithmetic logic unit to the nb buses. Therefore, while the m/nb arithmetic logic units are processing the m/nb data, the arrayed processor can control both input the m/nb data from the m/nb buses to the m/nb arithmetic logic units, and output the m/nb data from the m/nb arithmetic logic units to the m/nb buses according to an object program.

Each of the processing elements has an mb register file unit for temporarily holding the mb data input thereto and outputting the mb data, and an nb register file unit for temporarily holding the nb data input thereto and outputting the nb data. Thus, the m/nb data processed by the m/nb arithmetic logic units in each of the processing elements can temporarily be held in the respective dedicated m/nb register file units without being wasted.

Each of the processing elements has a solo register file unit for temporarily holding the mb data input thereto, outputting the mb data as at least one of the mb data and the nb data, temporarily holding the nb data input thereto, and outputting the nb data as at least one of the mb data and the nb data. Consequently, the solo register file unit can temporarily hold both the mb data and the nb data and convert the mb data and the nb data to each other.

Each of the processing elements has internal interconnection resources for controlling connections between the mb arithmetic logic unit, the nb arithmetic logic unit, and a register file unit in each of the processing elements. Therefore, connections between the mb arithmetic logic unit, the nb arithmetic logic unit, and the register file unit in each of the processing elements can be controlled according to an object program.

Each of the processing elements includes a DMU (Data Manipulation Unit) having a masking circuit for manipulating at least the mb data and the nb data. Accordingly, each of the processing elements can convert the mb data and the nb data to each other according to an object program.

Manipulating the m/nb data may perform at least one of the following operations: generating nb data from mb data, generating mb data from nb data, generating different mb data from mb data, and generating different nb data from nb data.

The nb arithmetic logic unit is provided as part of the DMU. Therefore, the solo DMU can manipulate the m/nb data and process the nb data.

The DMU has a shifting circuit for shifting at least the mb data. The DMU has a numerical value holding circuit for temporarily holding numerical data for use in processing the mb data. The DMU has a masking circuit for masking at least the mb data. The DMU has an OR gate for OR operation at least the mb data. With these arrangements, the DMU can process at least the mb data in various ways separately from the mb arithmetic logic unit.

In the arrayed processor, "nb" represents 1 bit. Since the nb arithmetic unit can process minimum-bit data, the arrayed processor can reliably perform a processing process even if the number of bits of the processing data is changed in various ways.

A first embodiment of data processing system of the present invention includes an arrayed processor according to the present invention, a data processing apparatus, a code supply means, a code transfer means, and a data input means. The code supply means supplies source codes to the data processing apparatus. The code transfer means inputs object codes output from the data processing apparatus to the arrayed processor. The data input means inputs the processing data to the arrayed processor. The first data processing system can have the arrayed processor process the processing data according to the object codes.

A second embodiment of data processing system of the present invention includes an arrayed processor according to the present invention, a code storage means, a code transfer means, and a data input means. The code storage means registers a plurality of types of object codes in advance therein. The code transfer means inputs a selected one of the types of object codes registered in the code storage means to the arrayed processor. The data input means inputs the processing data to the arrayed processor. The second data processing system can have the arrayed processor process the processing data according to one of the types of the source codes which are provided in advance.

The various means referred to herein may be arranged to perform their functions, and may be dedicated hardware components for carrying out desired functions. The various means referred to herein are not required to be independent of each other, and a certain means may be part of another means.

The information storage medium referred to herein may be a hardware component storing therein a computer program for enabling the data processing apparatus to carry out various processing tasks. For example, the information storage medium may be a ROM (Read Only Memory) or a HDD (Hard Disk Drive) fixedly mounted in an apparatus which incorporates the data processing apparatus, or a CD (Compact Disc)-ROM or an FD (Floppy Disc) replaceably inserted in an apparatus which incorporates the data processing apparatus.

The data processing apparatus referred to herein may be a hardware component for reading a computer program and executing a corresponding processing task. The data processing apparatus may be primarily a CPU connected to various devices including a ROM, a RAM (Random Access Memory), an I/F (InterFace) unit, etc.

Having the data processing apparatus perform various operations according to a computer program may allow the data processing apparatus to control operation of various devices. For example, saving various data in the data processing apparatus may store various data in an information storage medium such as a RAM or the like which is incorporated as part of the data processing apparatus, and store various data in an information storage medium such as an FD or the like which is replaceably inserted in the data processing apparatus.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1A:
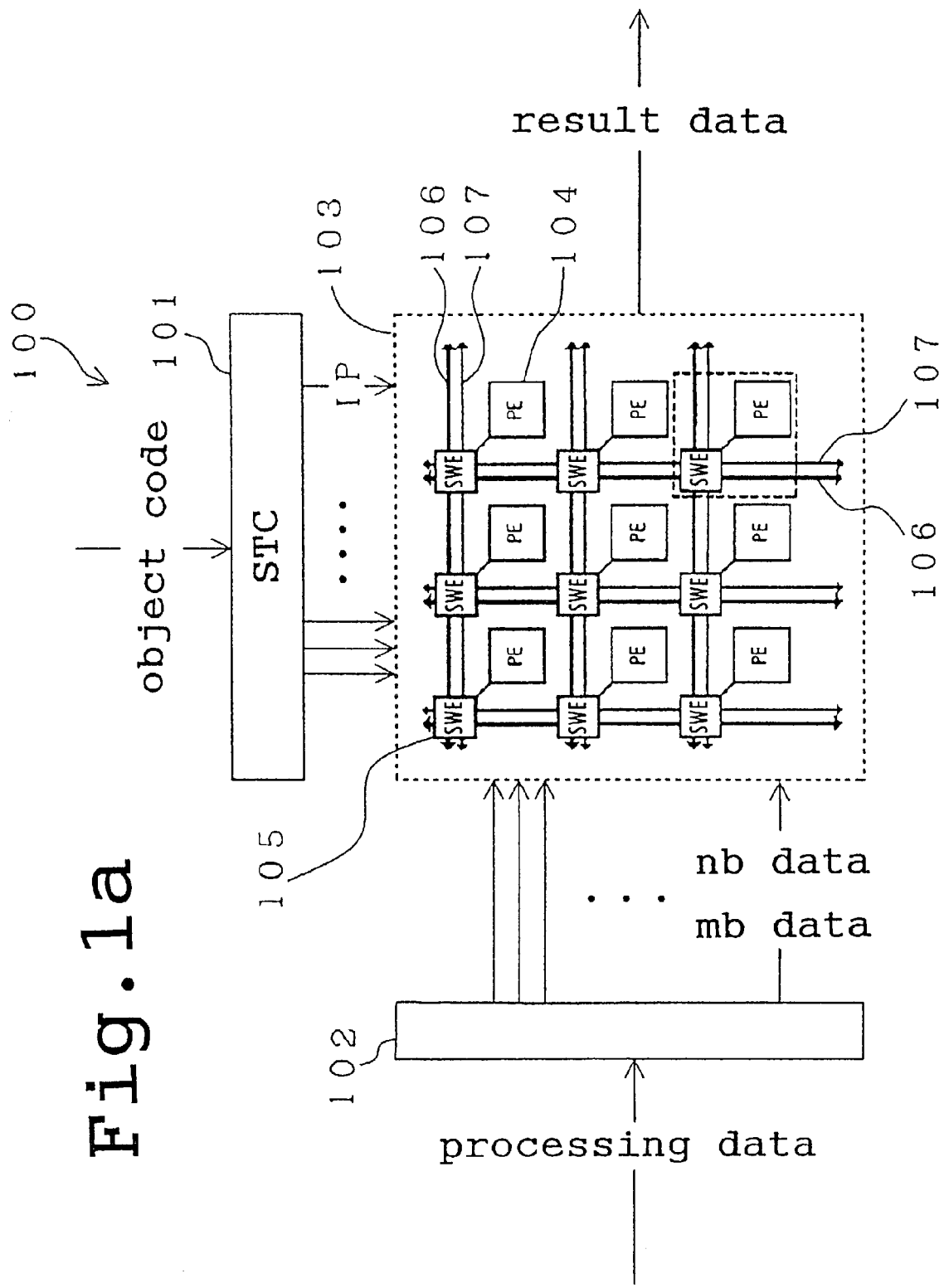
FIG. 1a is a block diagram of an overall structure of an arrayed processor according to an embodiment of the present invention.

As shown in FIG. 1a, an arrayed processor according to an embodiment of the present invention has state transition controller 101, data distributor 102, and data processor 103. Data processor 103 comprises a plurality of processing elements 104, a plurality of switch elements 105, a number of mb buses 106, and a number of nm buses 107 arranged in a matrix.

Figure 1B:
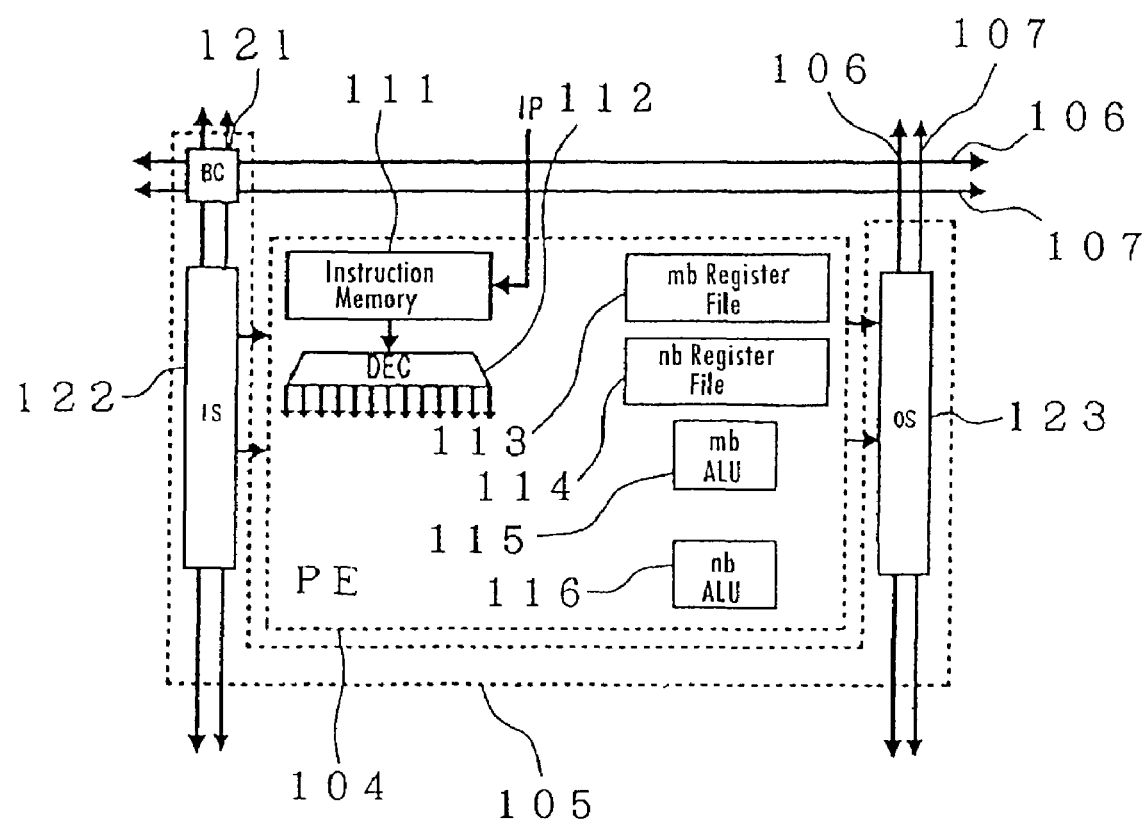
FIG. 1b is a block diagram of an internal structure of a processing element.

As shown in FIGS. 1b and 2, each of processing elements 104 comprises instruction memory 111, instruction decoder 112, mb register file unit 113, nb register file unit 114, mb ALU (Arithmetic Logic Unit) 115, nb ALU 116, internal interconnection resources 117, etc. Each of switch elements 105 has bus connector 121, input control circuit 122, output control circuit 123, etc.

State transition controller 101 holds a series of object codes supplied from an external circuit, generates instruction pointers for respective processing elements 104, and supplies the generated instruction pointers to respective processing elements 104.

Instruction memory 111 of each processing element 104 stores a plurality of instruction codes in advance. One of the stored instruction codes is designated by the instruction pointer supplied from state transition controller 101. Instruction decoder 112 decodes the instruction code designated by the instruction pointer, and controls operation of switch element 105, internal interconnection resources 117, and m/nb ALUs 115, 116.

Mb buses 106 transmit mb data of 8 bits, and nb buses 107 transmit nb data of 1 bit. Switch elements 105 control connections of processing elements 104 by m/nb buses 106, 107 under the control of instruction decoder 112.

More specifically, four mb buses 106 and four nb buses 107 are connected to bus connector 121 of each switch element 105, and bus connector 121 controls connections between mb buses 106 thus connected thereto and also controls connections between nb buses 107 thus connected thereto.

For the sake of brevity, the components of arrayed processor are illustrated as being arrayed in a plane. Actually, however, m/nb buses 106, 107, switch elements 105, and processing elements 104 may be constructed in a laminated structure.

Input control circuit 122 controls connections of input data from mb bus 106 to mb register file unit 113 and mb ALU 115, and also controls connections of input data from nb bus 107 to nb register file unit 114 and nb ALU 116. Output control circuit 123 controls connections of output data from mb register file unit 113 and mb ALU 115 to mb bus 106, and also controls connections of output data from nb register file unit 114 and nb ALU 116 to nb bus 107.

Data distributor 102 divides a series of processing data supplied from an external circuit into mb data and nb data, and input these m/nb data from m/nb buses 106, 107 whose connections are controlled by switch elements 105 to certain ones of processing elements 104.

Figure 2A:
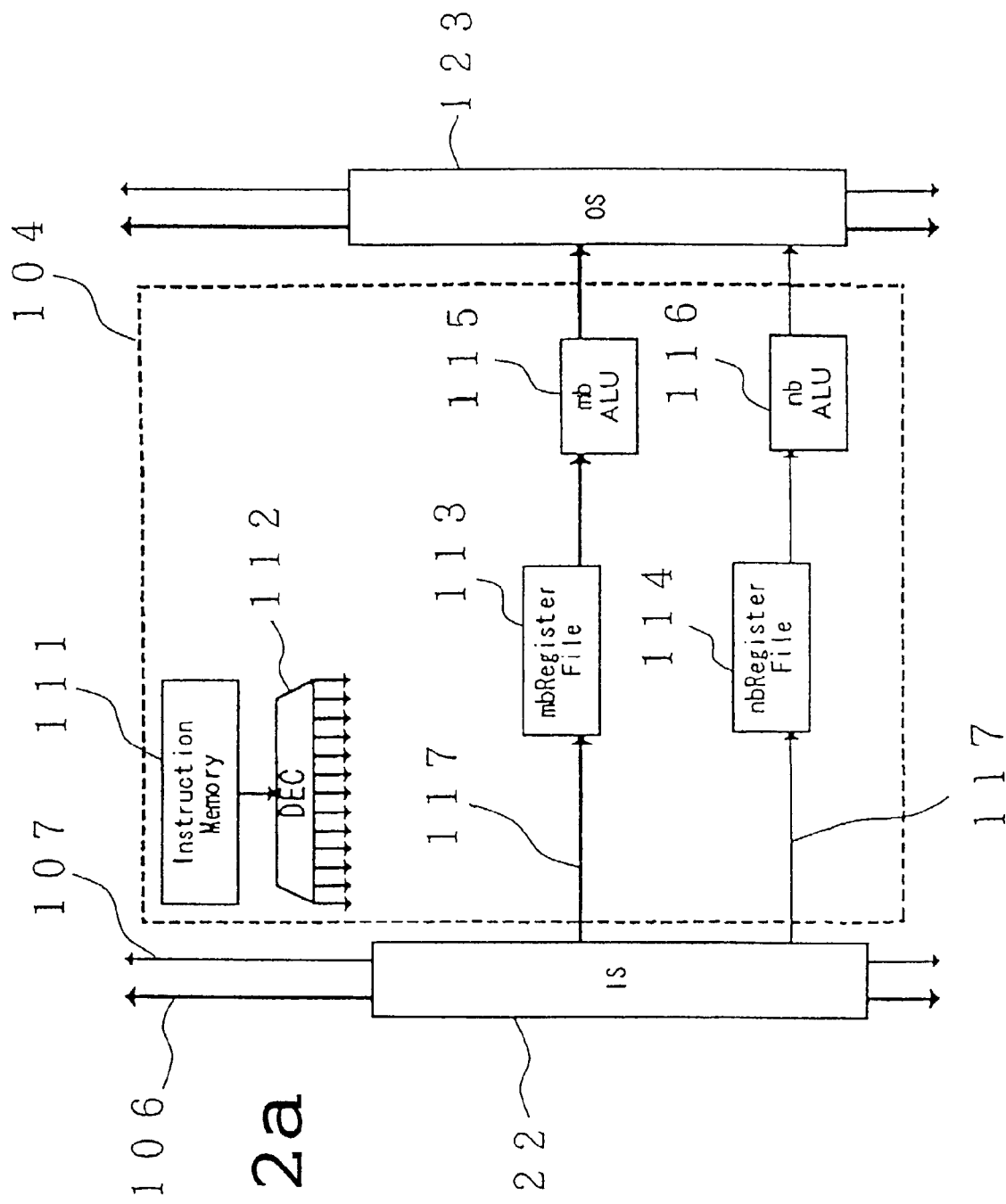
FIGS. 2a and 2b are block diagrams showing connections inside the processing element.
Figure 2B:
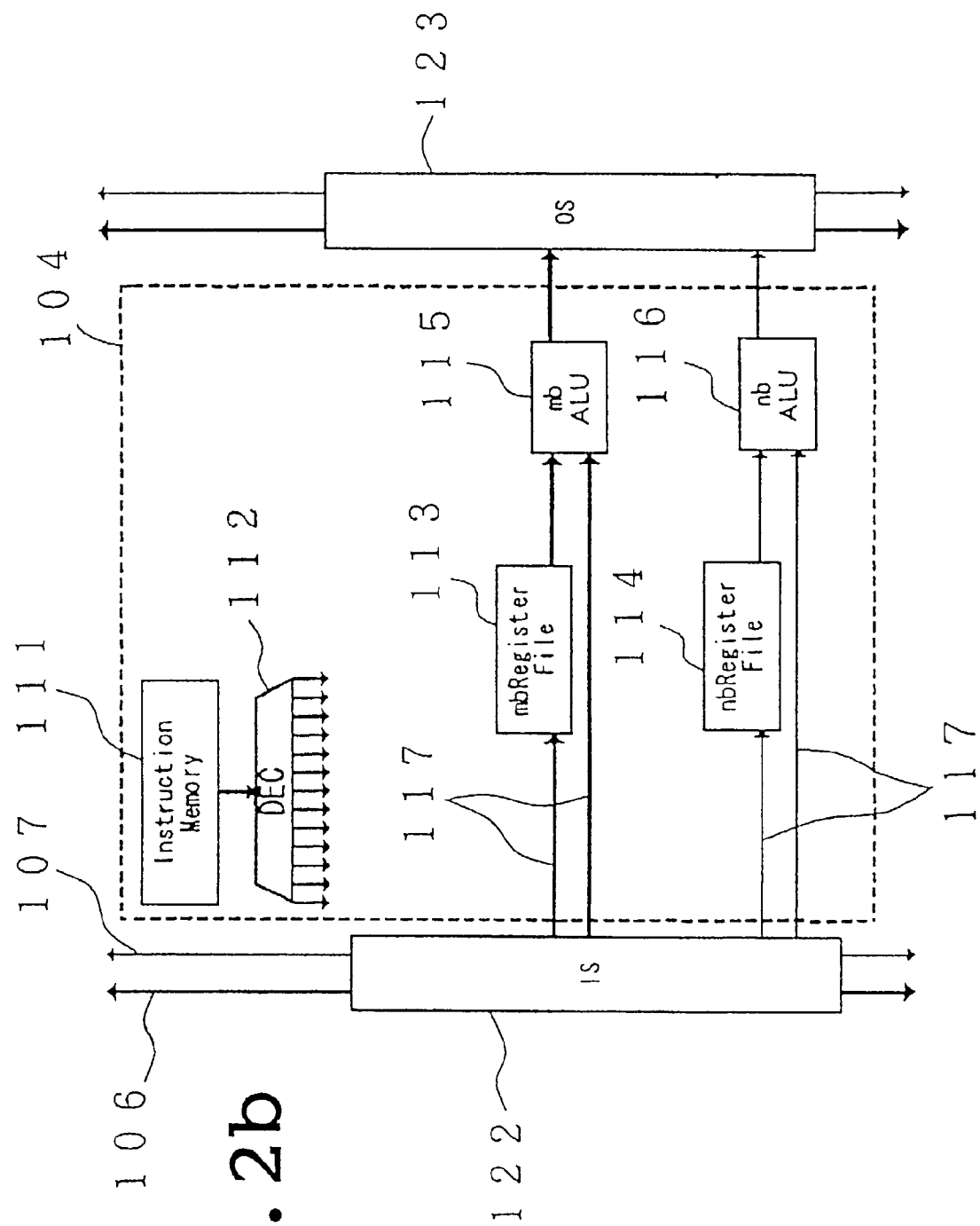

Internal interconnection resources 117 of each processing element 104 control connections between mb register file unit 113 and mb ALU 115 and connections between nb register file unit 114 and nb ALU 116 in the processing element 104 under the control of instruction decoder 112, as shown in FIGS. 2a and 2b.

Mb register file unit 113 temporarily stores mb data input from mb bus 106 and outputs the stored mb data to mb ALU 115 according to connections controlled by internal interconnection resources 117.

Nb register file unit 114 temporarily stores nb data input from nb bus 107 and outputs the stored nb data to nb ALU 116 according to connections controlled by internal interconnection resources 117.

Mb ALU 115 processes the mb data under the control of instruction decoder 112, and nb ALU 116 processes the nb data under the control of instruction decoder 112.

Figure 3:
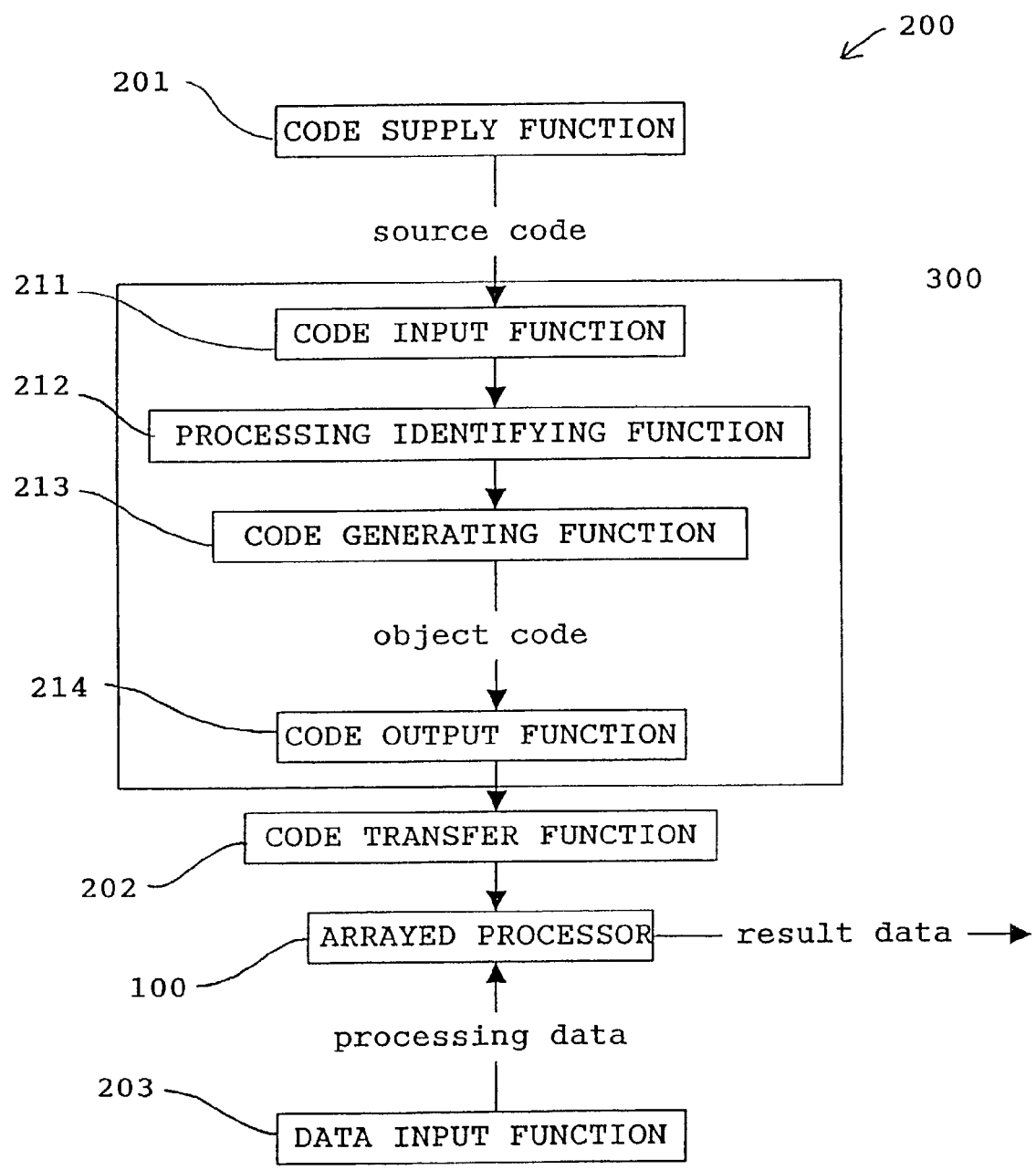
FIG. 3 is a diagram showing a logic structure of a data processing system according to an embodiment of the present invention.

As shown in FIG. 3, a data processing system 200 according to an embodiment of the present invention, which incorporates arrayed processor 100 constructed as described above, has arrayed processor 100, data processing apparatus 300, code supply function 201, code transfer function 202, and data input function 203.

Figure 4:
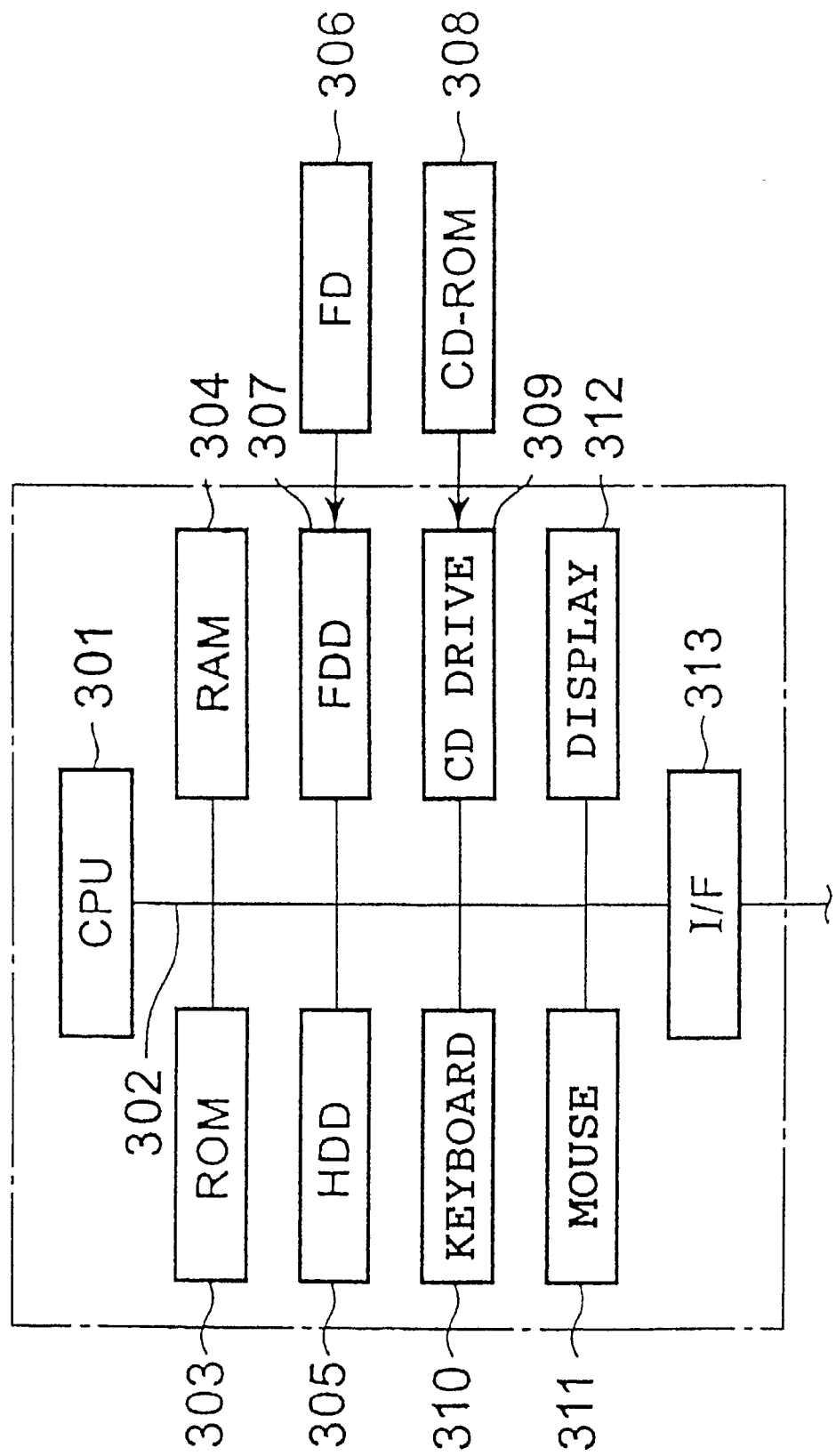
FIG. 4 is a block diagram showing a physical structure of a data processing apparatus in the data processing system.

As shown in FIG. 4, data processing apparatus 300 has CPU 301 serving as a main hardware component of a computer. To CPU 301, there are connected, by bus line 302, hardware components including ROM 303, RAM 304, HDD 305, FDD (FD drive) 307 in which FD 306 is replaceably inserted, CD drive 309 in which CD-ROM 308 is replaceably inserted, keyboard 310, mouse 311, display unit 312, I/F unit 313, etc.

In data processing apparatus 300, hardware components including ROM 303, RAM 304, HDD 305, replaceable FD 306, and replaceable CD-ROM 308 corresponding to information storage mediums, and computer programs for CPU 301 and various data are stored as software in at least one of those hardware components.

For example, a computer program for enabling CPU 301 to perform various processing processes is stored in FD 306 and CD-ROM 308 in advance. The computer program is installed in HDD 305 in advance. When data processing apparatus 300 is activated, the installed computer program is copied from HDD 305 into RAM 304, from which the computer program is read by CPU 301.

When CPU 301 reads the computer program and performs various processing processes according to the computer program, data processing apparatus 300 has various functions including code input function 211, processing identifying function 212, code generating function 213, and code output function 214, logically as various functions.

Code supply function 201 of data processing system 210 comprises FD 306 in which source codes are stored, for example. Code supply function 201 supplies source codes in which processing operation of arrayed processor 100 is described to code input function 211 of data processing apparatus 300.

Code input function 211 corresponds to a function for CPU 310 to control operation of FDD 307 according to the computer program stored in RAM 304. Source codes are input from code supply function 210 to code input function 211.

Processing identifying function 212 and code generating function 213 correspond to a function for CPU 301 to perform a certain data processing process according to the above computer program. Processing identifying function 212 analyzes supplied source codes and identifies the described contents as those for mb data and those for nb data. Code generating function 213 generates object codes from the identified described contents.

Code output function 214 corresponds to a function for CPU 301 to control the outputting of data from I/F unit 313 according to the computer program. Code output function 214 outputs the generated object codes to code transfer function 202 of data processing system 200.

Code transfer function 202 corresponds to a connector (not shown) which connects I/F unit 313 of data processing apparatus 300 and state transition controller 102 of arrayed processor 100 to each other. Code transfer function 202 inputs the object codes output from data processing apparatus 300 to arrayed processor 100.

Data input function 203 comprises a data generating circuit (not shown), and generates a series of processing data and inputs the processing data to data distributor 102 of arrayed processor 100.

The above various functions of data processing apparatus 300 are implemented using hardware components including FDD 307, I/F unit 312, etc., but mainly are implemented by CPU 301 as a hardware component of data processing apparatus 300 which functions according to the software stored in the information storage mediums including RAM 304, etc.

The software is stored in the information storage mediums including RAM 304, etc. as a computer program for enabling CPU 301 to perform a process of inputting source codes, in which processing operation of arrayed processor 100 is described, with FDD 307, a process of analyzing the input source codes and identifying the described contents of the source codes as those for mb data and those for nb data, a process of generating object codes from the identified described contents, and a process of outputting the generated object codes from I/F unit 313.

Data processing system 200 operates as follows: Data processing apparatus 300 converts source codes supplied from code supply function 201 into object codes, and inputs the object codes into arrayed processor 100. Data input function 203 inputs a series of processing data into arrayed processor 100. Arrayed processor 100 processes the input processing data according to the input object codes.

When source codes descriptive of processing operation of arrayed processor 100 are input into data processing apparatus 300, data processing apparatus 300 analyzes the input source codes, and identifies the described contents of the source codes as those for mb data of 8 bits and those for nb data of 1 bit. Data processing apparatus 300 then generates object codes from the identified described contents, and outputs the generated object codes to arrayed processor 100.

In arrayed processor 100 to which object codes are input from data processing apparatus 100, state transition controller 101 holds the input object codes and generates instruction pointers for respective processing elements 104. The instruction pointer for each of respective processing elements 104 designates one of a plurality of instruction codes stored in instruction memory 111 of each processing element 104.

The designated instruction code is decoded by instruction decoder 112, which controls connections of processing elements 104 by switch elements 105, connections in processing elements 104 by internal interconnection resources 117, and processing processes of m/nb ALUs 115, 116. Arrayed processor 100 according to the present embodiment thus operates as a hardware component for performing processing processes according to the object codes.

Then, a series of processing data input from data input function 203 are divided by data distributor 102 into mb data and nb data, which are processed by mb ALUs 115 and nb ALUs 116 of processing elements 104 whose connections and processing processes are controlled as described above.

As described above, arrayed processor 100 is capable of processing mb data of 8 bits and nb data of 1 bit in parallel in each of processing elements 104 according to the object codes. Therefore, even if the number of bits of the input series of processing data is changed, arrayed processor 100 can distribute those processing data appropriately into different data based on the number of bits and processing the different data in parallel with high efficiency.

Furthermore, m/nb register file units 113, 114 in respective processing elements 104 temporarily hold and output the input m/nb data. Consequently, the m/nb data to be processed by m/nb ALUs 115, 116 in each of processing elements 104 can temporarily be held by dedicated m/nb register file units 114 without being wasted.

Inasmuch as "nb" comprises 1 bit in arrayed processor 100, nb ALU 116 can perform processing processes with a minimum number of bits. Arrayed processor 100 can thus perform processing processes reliably even if the number of bits of processing data is changed in various ways.

As described above, data processing apparatus 300 can generate object codes for arrayed processor 100, whose described contents have been identified as those for mb data and those for nb data, from source codes in which processing operation of arrayed processor 100 is described, according to a general process.

When inputting processing data to arrayed processor 100, data processing system 200 supplies source codes to data processing apparatus 300 so as to input object codes into arrayed processor 100. Therefore, data processing system 200 can switch between various processing operations of arrayed processor 100 on a real-time basis.

The present invention is not limited to the above illustrated embodiment, but various changes and modifications may be made therein without departing from the scope of the invention. For example, in the above embodiment, data processing system 200 has data processing apparatus 300 connected to arrayed processor 100 and is capable of switching between various processing operations on a real-time basis.

However, it is possible to connect a RAM or a ROM storing object codes to arrayed processor 100, and to cause arrayed processor 100 to perform a single processing task in a fixed manner according to the stored object codes. Alternatively, a plurality of types of object codes may be stored in advance in a code storage means such as a RAM or a ROM, and one type of object codes may be transferred to arrayed processor 100, so that processing operations thereof can be switched over on a real-time basis.

In the above embodiment, CPU 301 operates according to the computer program stored in RAM 304, etc. to logically implement various functions as various functions of data processing apparatus 10.

However, it is also possible to implement the various functions as inherent hardware components, or to store some of the various functions as software in RAM 304, etc. and construct some of the various functions as hardware.

In the above embodiment, arrayed processor 100 divides processing data into mb data of 8 bits and nb data of 1 bit and processes those divided data. However, the number of divided processing data may be selected as desired, and the numbers of bits into which processing data are to be divided may be selected as desired.

Figure 5:
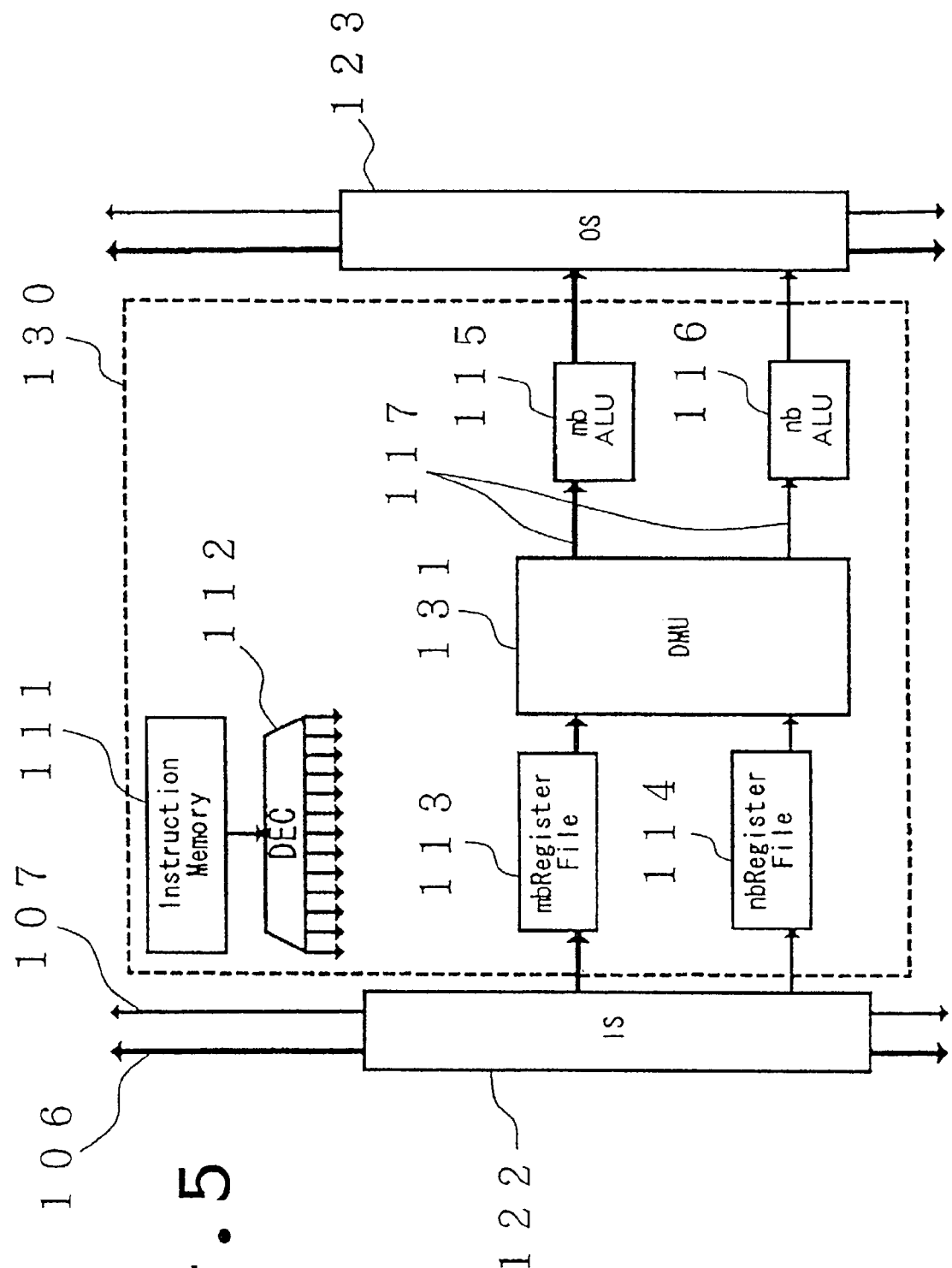
FIG. 5 is a block diagram of an internal structure of a processing element according to a first modification of the present invention.

In the above embodiment, each of processing elements 104 has m/nb register file units 113, 114 and m/nb ALUs 115, 116 as components for performing processing processes in arrayed processor 100. However, as shown in FIG. 5, it is possible to add a DMU 131 to each processing element 130.

DMU 131, to be described in detail later on, can manipulate both mb data and nb data. An arrayed processor (not shown) with processing elements 130 can convert mb data and nb data, which are processed according to object codes, to each other.

Since DMU 131 and m/nb ALUs 115, 116 exist separately from each other, when DMU 131 combines mb data and nb data, m/nb ALUs 115, 116 can process mb data and nb data in parallel simultaneously.

Figure 6:
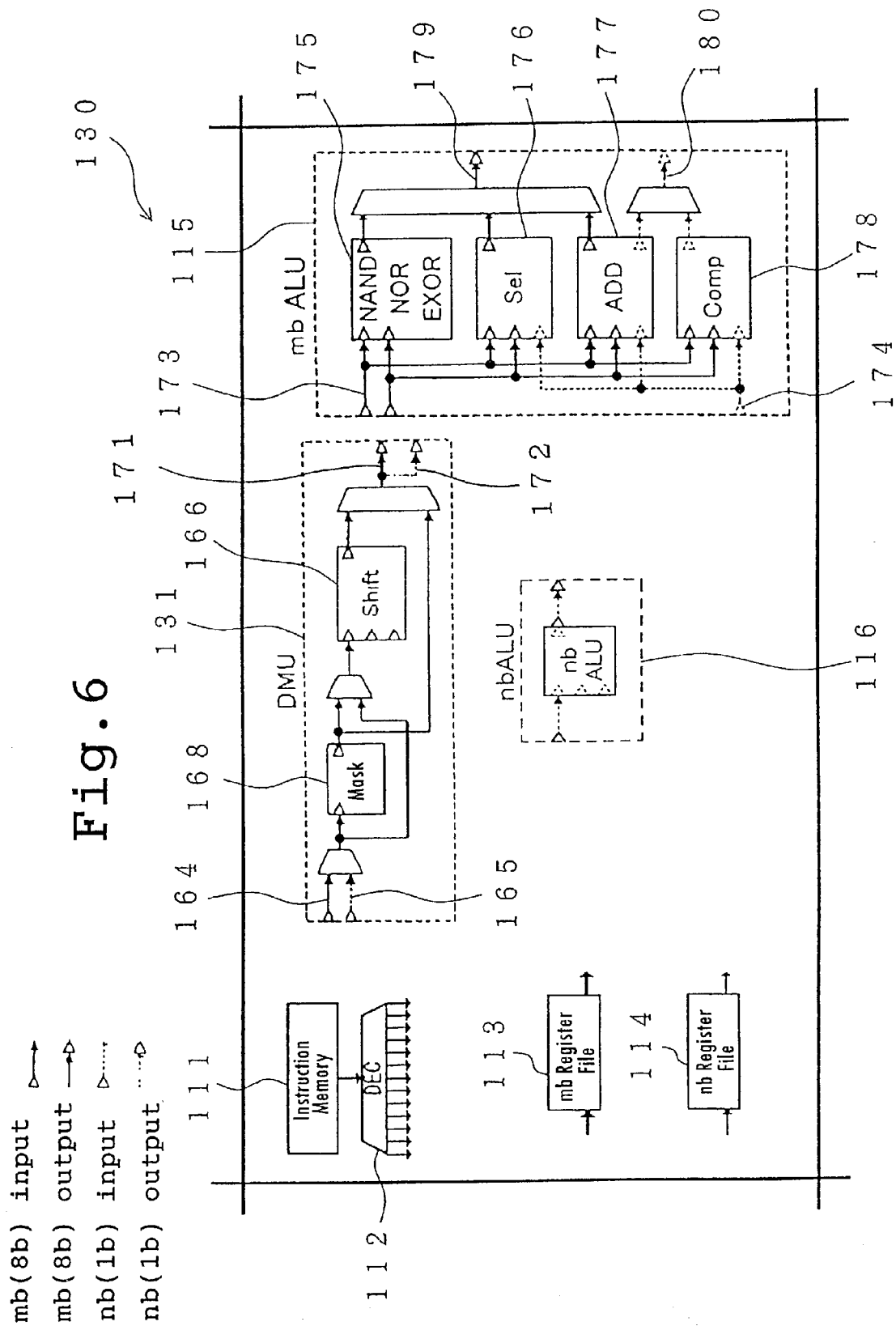
FIG. 6 is a block diagram of an internal structure of a DMU, etc. in the processing element according to the first modification.

An internal structure of processing element 130 will be described in specific detail below with reference to FIG. 6. DMU 131 has mb input port 164 to which mb data are input and nb input port 165 to which nb data are input, both parts being in parallel. A processing circuit including masking circuit 168 and shifting circuit 166 is connected to input ports 164, 165.

The processing circuit is connected to mb output port 171 for outputting mb data. Nb output port 172 is branched from mb output port 171 for outputting nb data parallel to mb data from mb output port 171.

DMU 131 thus constructed operates under the control of instruction decoder 112 to generate nb data from mb data, generate mb data from nb data, generate different mb data from mb data, and generate different nb data from nb data.

For example, for generating nb data from mb data, unwanted 7 bits of mb data are eliminated by a masking process of masking circuit 168, and a remaining 1 bit is shifted to the first place which is the bit position of nb data, by a shifting process of shifting circuit 166.

If a 1 bit to be extracted from mb data is initially present in the bit position of nb data, then DMU 131 can generate nb data from mb data only by the masking process of masking circuit 168. If 7 bits to be eliminated from mb data are initially "0", then DMU 131 can generate nb data from mb data only by the shifting process of shifting circuit 166.

Furthermore, the masking process of masking circuit 168 and the shifting process of shifting circuit 166 may be combined with each other to generate mb data from nb data, generate different mb data from mb data, and generate different nb data from nb data.

Because m/nb ALUs 115, 116 can process m/nb data separately from DMU 131, processing element 130 can individually manipulate m/nb data with DMU 131 and process m/nb data with m/nb ALUs 115, 116. These operations of m/nb ALUs 115, 116 and DMU 131 can be combined with each other.

Mb ALU 115 has two parallel mb input ports 173 to which mb data are input, and nb input port 174 to which nb data are input, mb input ports 173 and nb input port 174 being in parallel. Parallel mb input ports 173 are connected to logic circuit 175, selector circuit 176, ADD circuit 177, and comparator circuit 178 which are all connected in parallel. Nb input port 174 is connected to circuits 176, 177, 178 which are connected in parallel.

Circuits 175, 176, 177, 178 are connected to one mb parallel output port 179, and circuits 177, 178 are connected to one nb output port 180. Mb ALU 115 can process not only mb data, but also part of nb data.

Shifting circuit 166, etc. of DMU 131 has been described above as processing only mb data. However, shifting circuit 166 may be arranged to process both mb data and nb data, or to process nb data only, if necessary.

DMU 131 has been described above as having masking circuit 168 and shifting circuit 166. However, as shown in FIG. 7, processing element 130*a* may have DMU 131*a* including mask circuit 168 only for performing mutual conversion between mb data and nb data.

Figure 7:
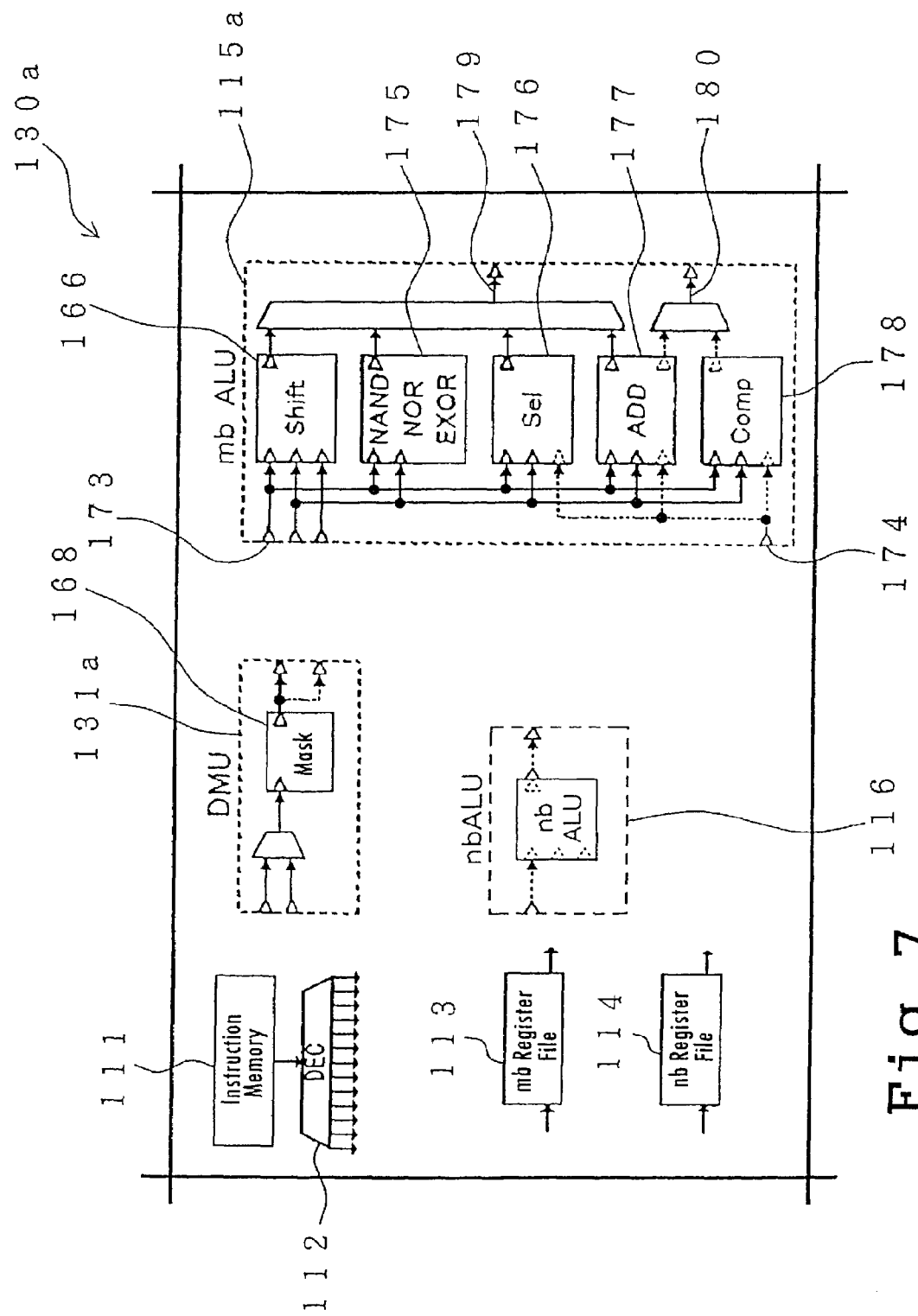
FIG. 7 is a block diagram of an internal structure of a first modified DMU, etc.

In the modified DMU shown in FIG. 7, since DMU 131*a* is incapable of shifting data, mb ALU 115*a* should preferably have shifting circuit 116.

In the above embodiment, m/nb register file units 113, 114 are connected to m/nb buses 106, 107 by internal interconnection resources 117 of processing element 130, and m/nb input ports 164, 165 of DMU 131 are connected to /nb register file units 113, 114.

Figure 8:
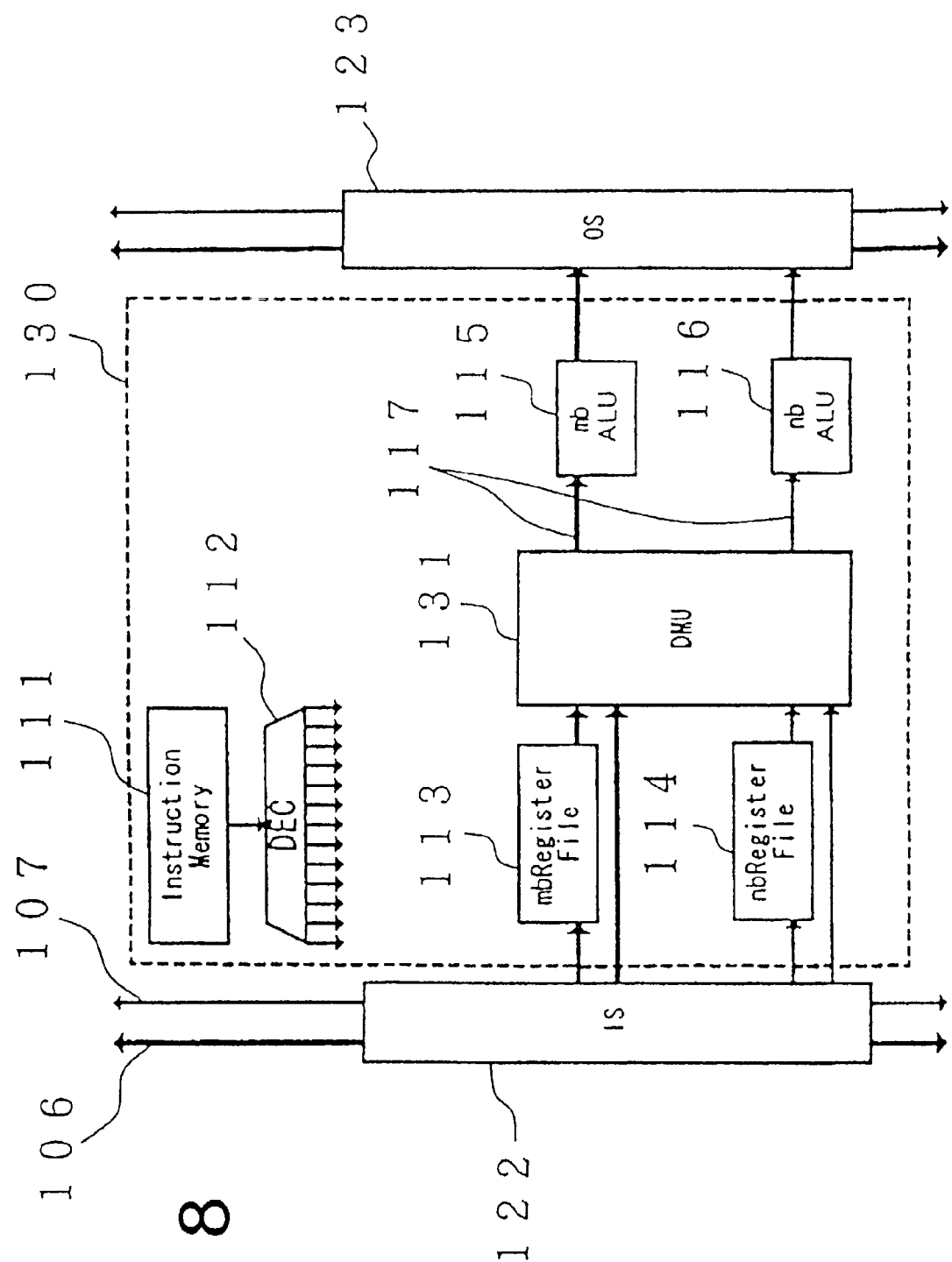
FIG. 8 is a block diagram showing connections inside a processing element.

However, as shown in FIG. 8, it is possible to connect m/nb buses 106, 107 and m/nb input ports 164, 165 of DMU 131 directly to each other with the above connections and internal interconnection resources 117.

With the structure shown in FIG. 8, DMU 131 is required to have two parallel ports as each of m/nb input ports 164, 165. Therefore, as shown in FIG. 9, a processing element 130*b* should preferably have DMU 131*b* including two parallel masking circuits 168 and two parallel shifting circuits 166 which are connected to solo OR gate 169.

Masking circuits 168 and shifting circuits 166 of DMU 131*b* can manipulate two mb data and two nb data, and OR gate 169 can output at least one of one mb data and one nb data.

Figure 10:
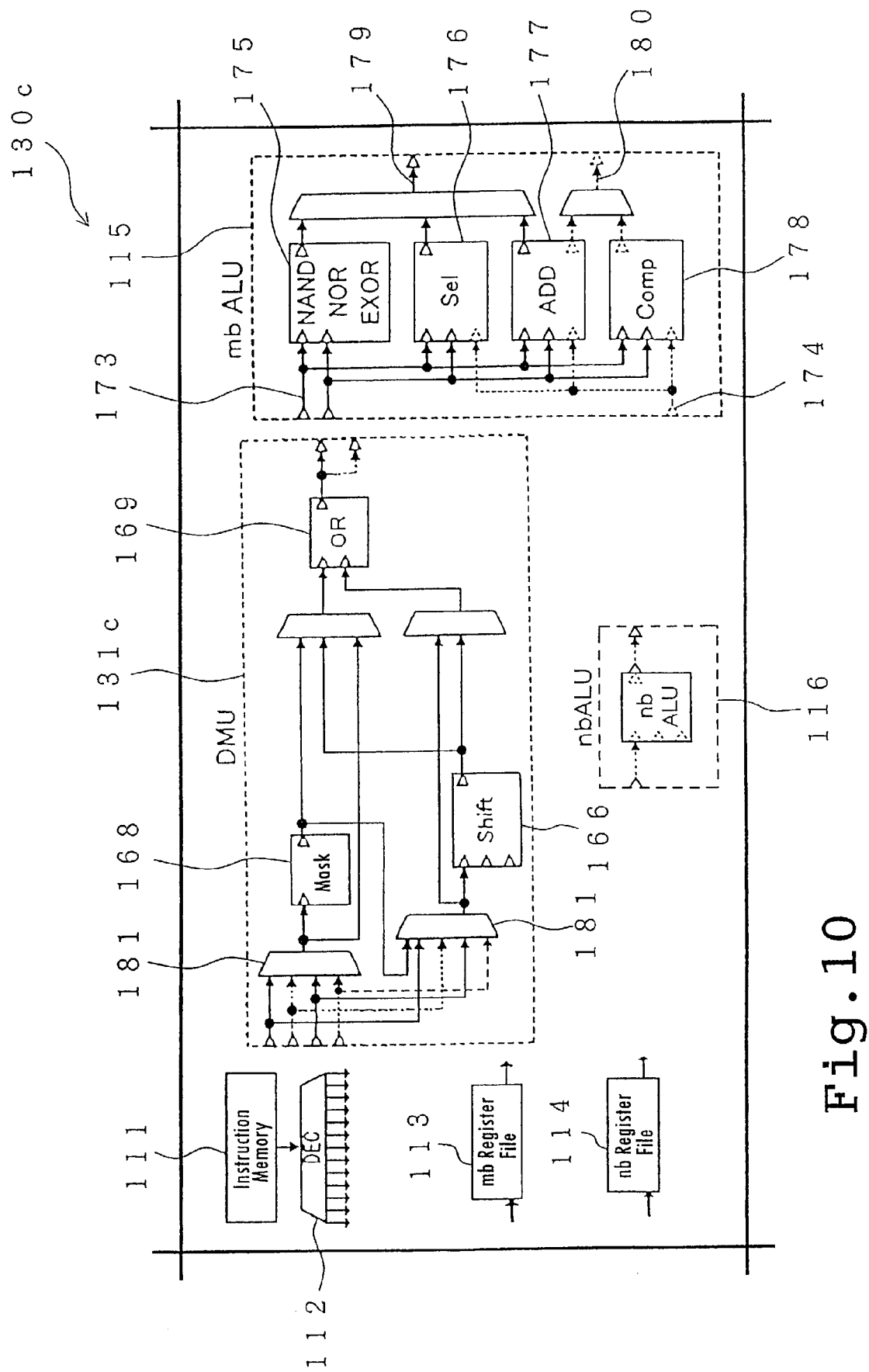
FIG. 10 is a block diagram of an internal structure of a third modified DMU, etc.

FIG. 10 shows processing element 130c having DMU 131c including two parallel mb input ports 164 and two parallel nb input ports 165, which are connected to one masking circuit 168 and one shifting circuit 166 by two parallel selector circuits 181.

Figure 9:
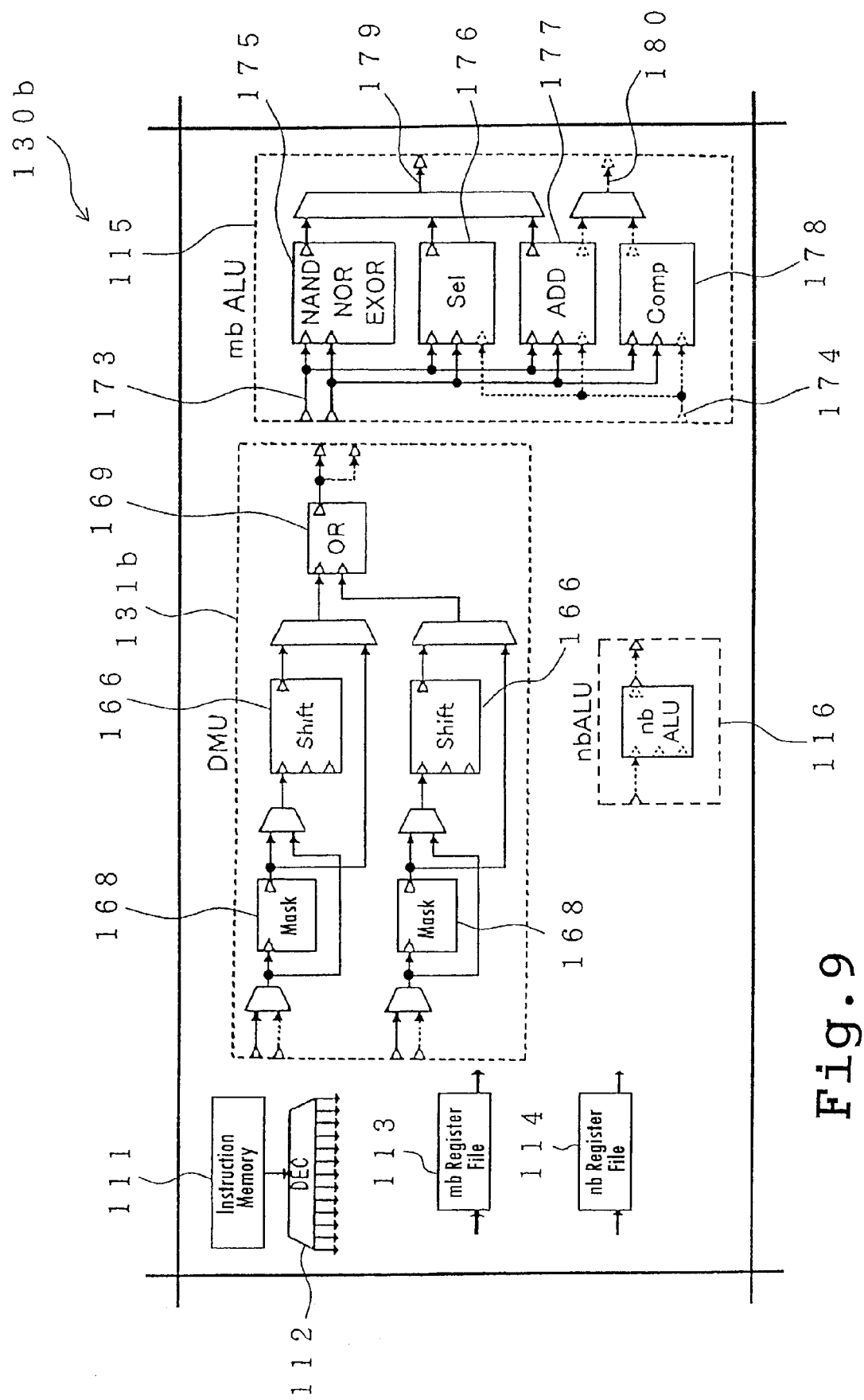
FIG. 9 is a block diagram of an internal structure of a second modified DMU, etc.

DMU 131b shown in FIG. 9 can mask and shift m/nb data in parallel though DMU 131b requires an increased circuit scale. DMU 131c shown in FIG. 10 has a reduced circuit scale though it can either mask or shift m/nb data at a time.

Since the above structures of DMUs 131b, 131c have their own advantages and disadvantages, one of them should be selected in view of various conditions to be met in an application in which it is to be used.

Figure 11:
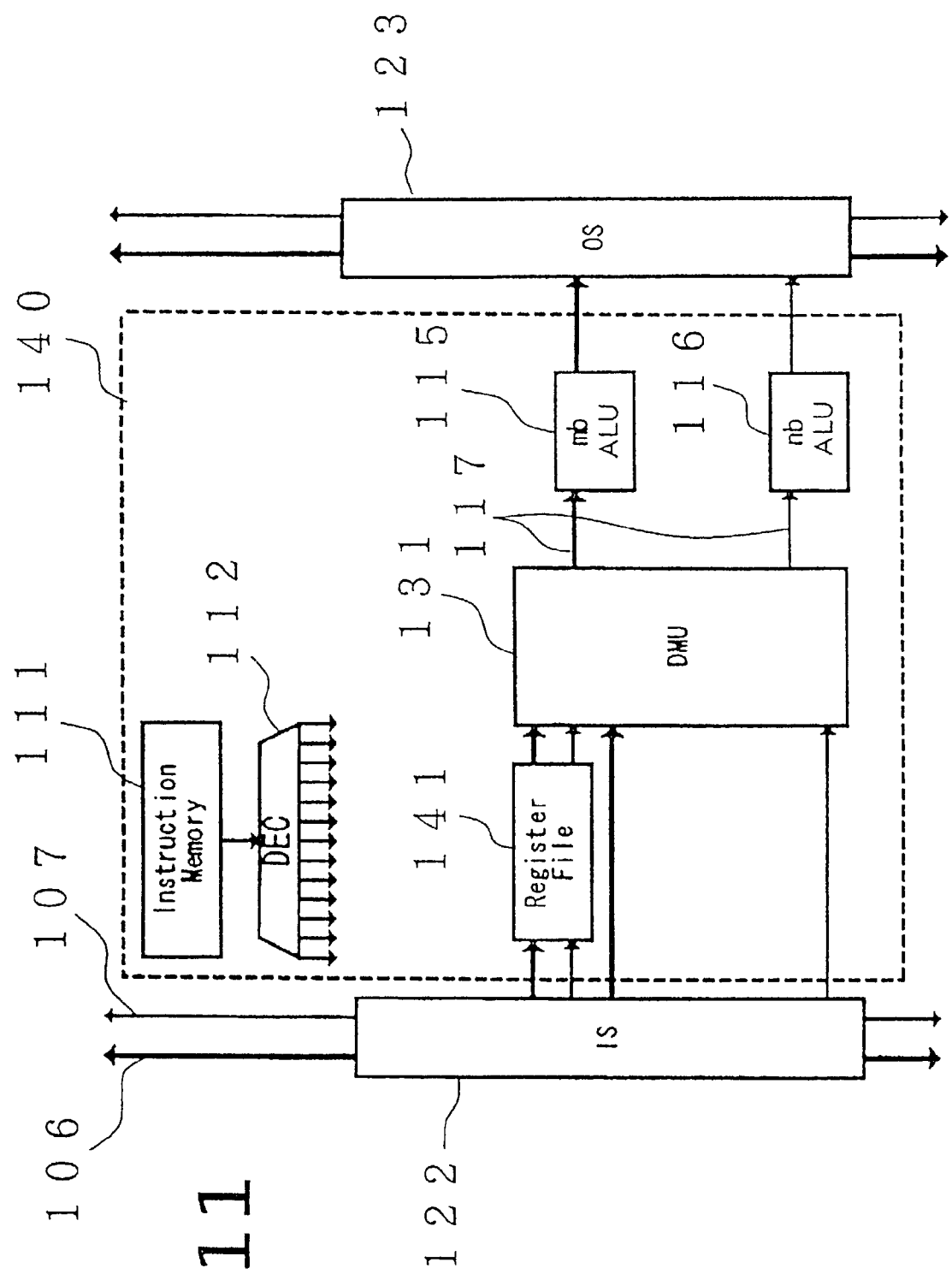
FIG. 11 is a block diagram of an internal structure of a processing element according to a second modification of the present invention.
Figure 12:
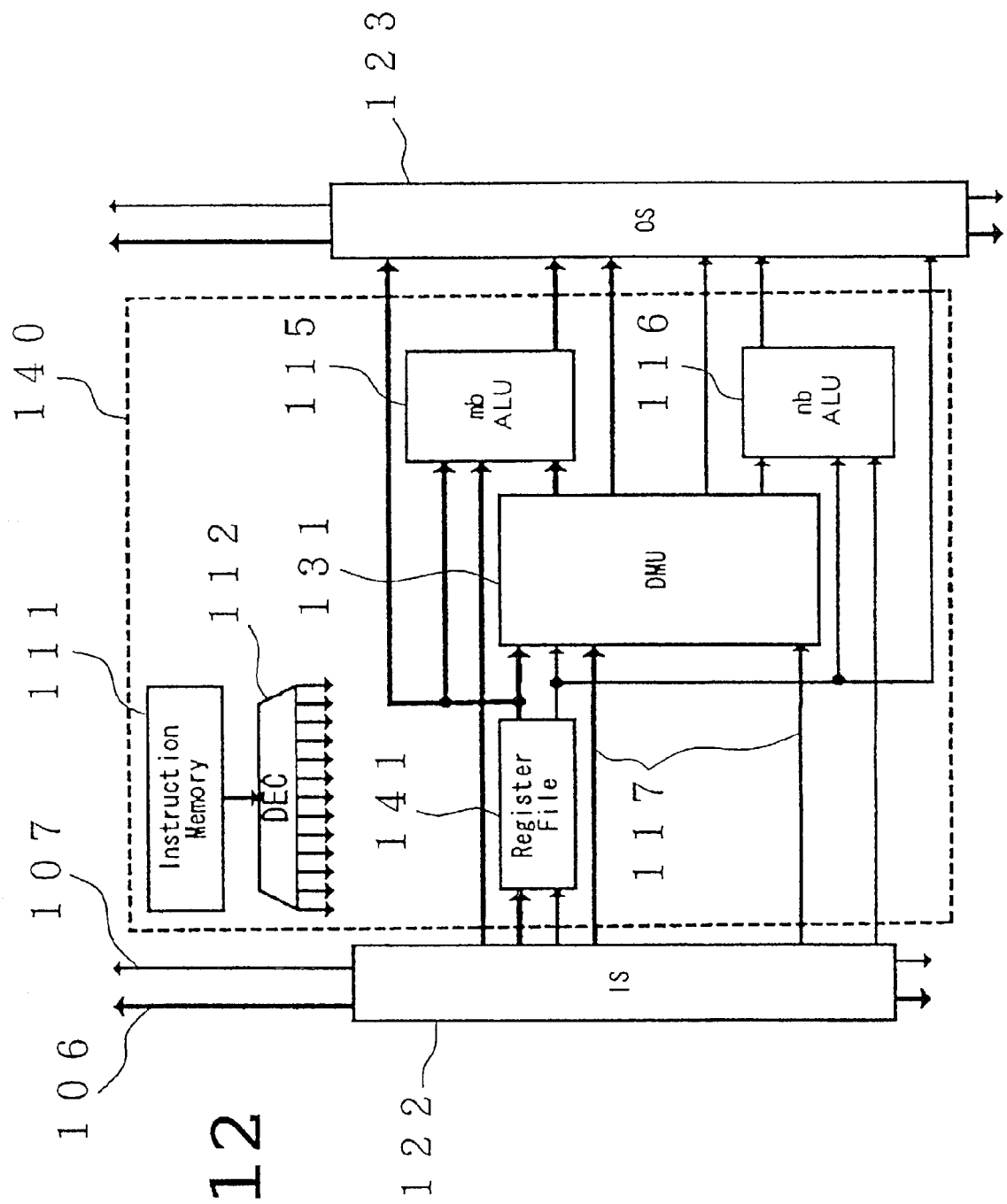
FIG. 12 is a block diagram showing connections inside a processing element.

In the above embodiment, each processing element 104 has mb register file unit 113 and nb register file unit 114. However, as shown in FIG. 11, each processing element 104 has solo register file unit 141.

Register file unit 141 is arranged to temporarily hold mb data of more bits. Therefore, register file unit 141 can temporarily hold nb data of fewer bits.

Specifically, register file unit 141 can temporarily hold input mb data and output mb data as mb data or nb data, and also can temporarily hold input nb data and output nb data as mb data or nb data.

Consequently, an arrayed processor (not shown) with processing elements 140 can perform mutual conversion between mb data and nb data with register file unit 141, and hence can have its circuit scale reduced for reducing an overall size thereof and increasing productivity.

If mb area of register file unit 141 temporarily holds nb data, then the storing capability thereof is partially wasted. Therefore, m/nb register file units 113, 114 dedicated for holding m/nb data and register file unit 141 used commonly for holding m/nb data have their own advantages and disadvantages, so that one of them should be selected in view of various conditions to be met in an application in which it is to be used.

By controlling connections over internal interconnection resources 117 with processing element 140, it is possible to transfer m/nb data input from m/nb buses 106, 107 to processing element 140 directly to not only register file unit 141 and DMU 131, but also m/nb ALUs 115, 116 and m/nb buses 106, 107, and also to transfer not only m/nb data output from m/nb ALUs 115, 116, but also m/nb data output from register file unit 141 and DMU 131, directly to m/nb buses 106, 107.

In processing element 130 described above, parallel m/nb ALUs 115, 116 are connected to DMU 131. However, as shown in FIG. 13, nb ALU 152 may be provided as part of DMU 151 of processing element 150.

Figure 13:
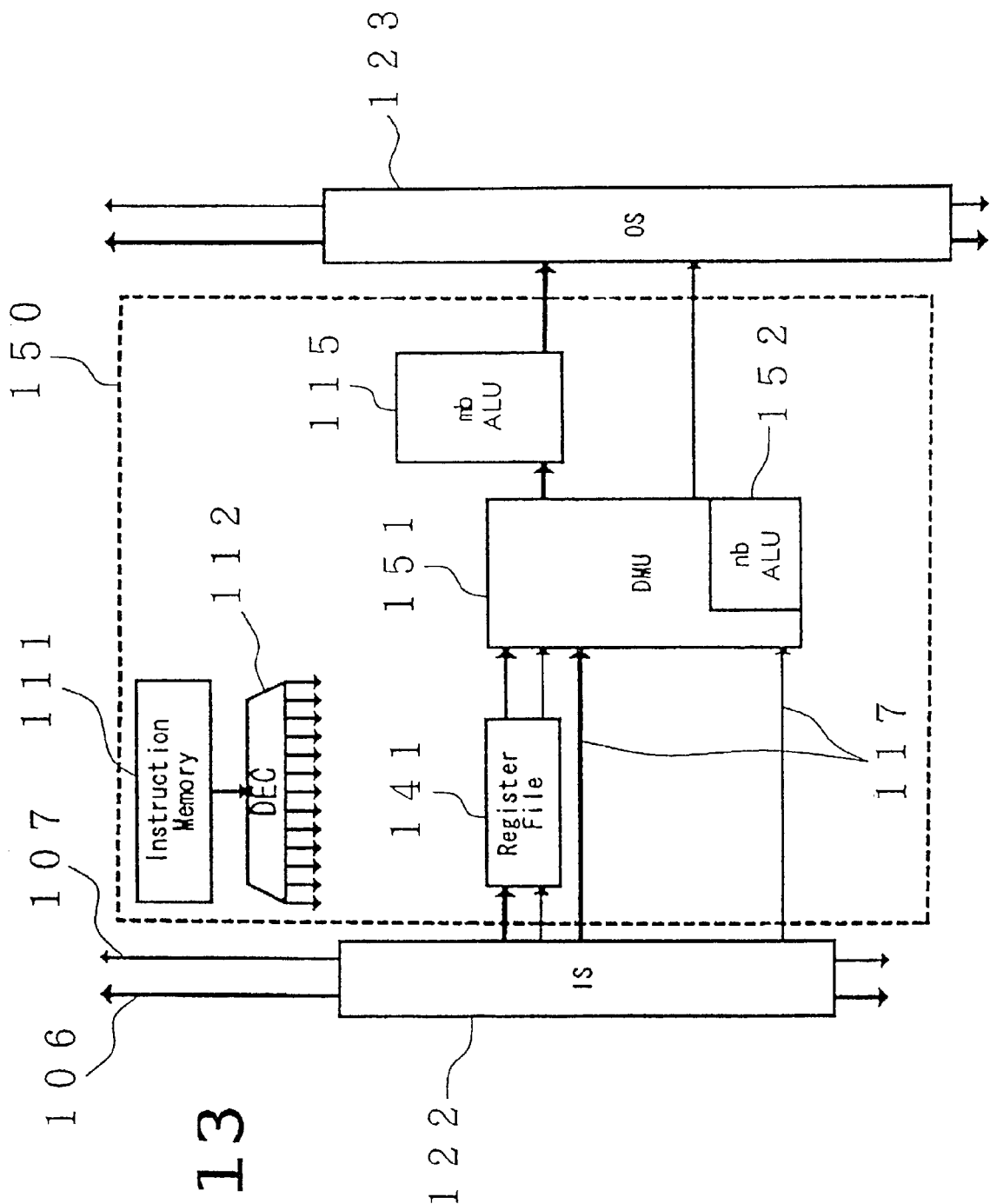
FIG. 13 is a block diagram of an internal structure of a processing element according to a third modification of the present invention.

In the arrangement shown in FIG. 13, solo DMU 151 is capable of converting m/nb data to each other and processing nb data, so that processing element 150 can have its circuit scale reduced for reducing an overall size thereof and increasing productivity.

Since dedicated nb ALU 116 and nb ALU 152 as part of DMU 151 have their own advantages and disadvantages, one of them should be selected in view of various conditions to be met in an application in which it is to be used.

Figure 14:
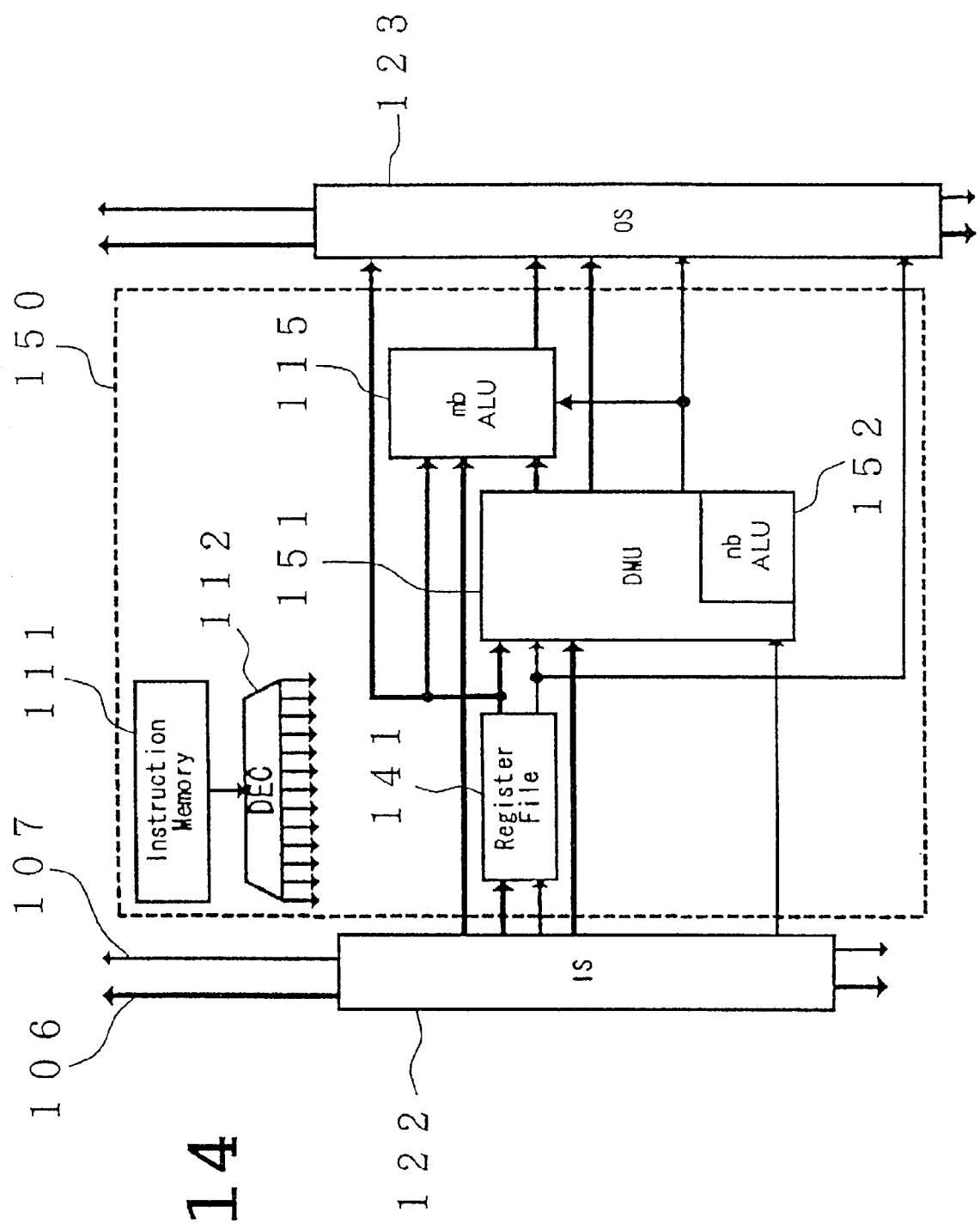
FIG. 14 is a block diagram showing an example of connections inside a processing element.
Figure 15:
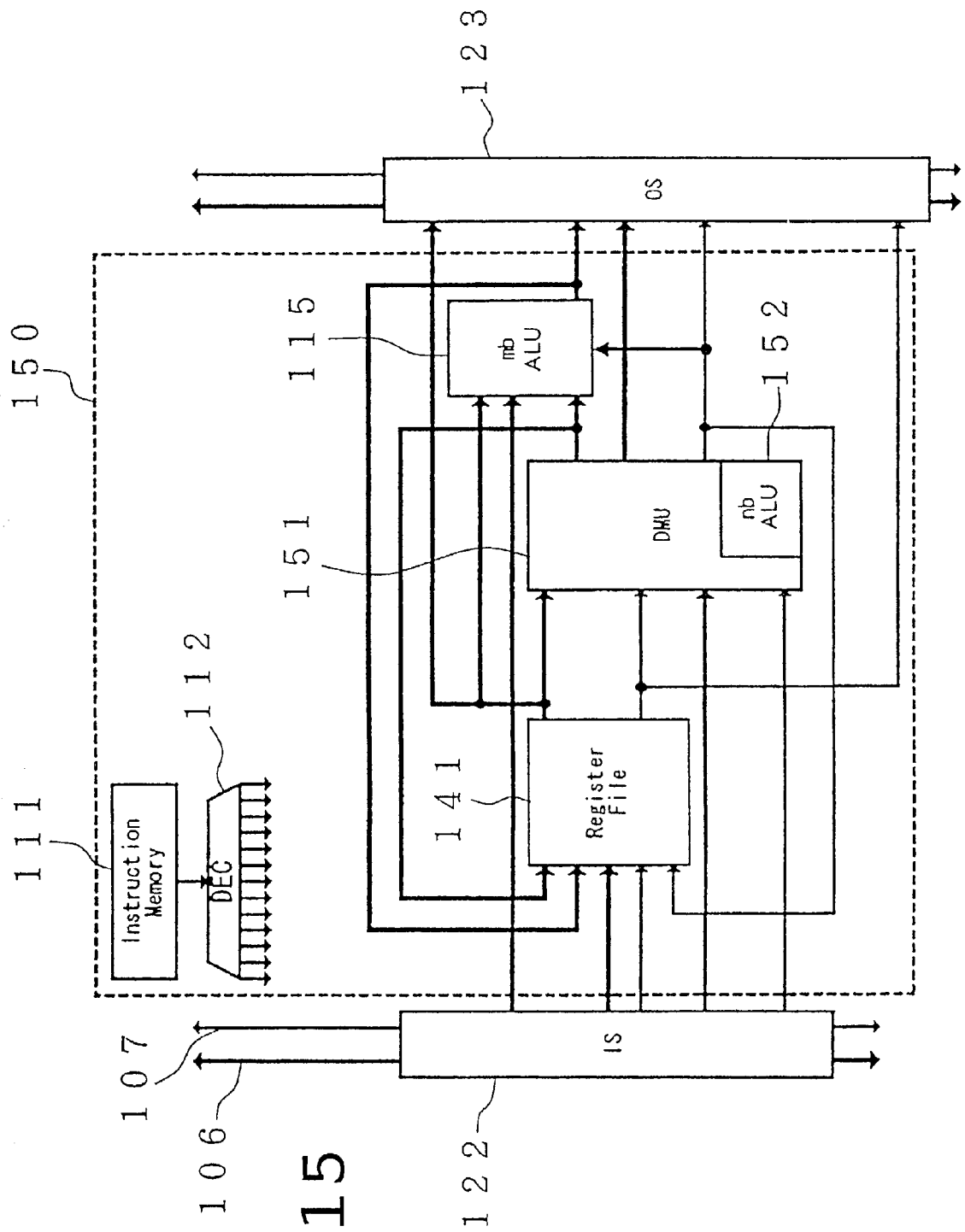
FIG. 15 is a block diagram showing another example of connections inside a processing element.

By controlling connections over internal interconnection resources 117 with processing element 150, it is possible to transfer m/nb data input from m/nb buses 106, 107 to processing element 150 directly to various components, and to transfer m/nb data output from various components directly to m/nb buses 106, 107, as shown in FIG. 14, and also to transfer m/nb data output from various components back to various components, as shown in FIG. 15.

Figure 16:
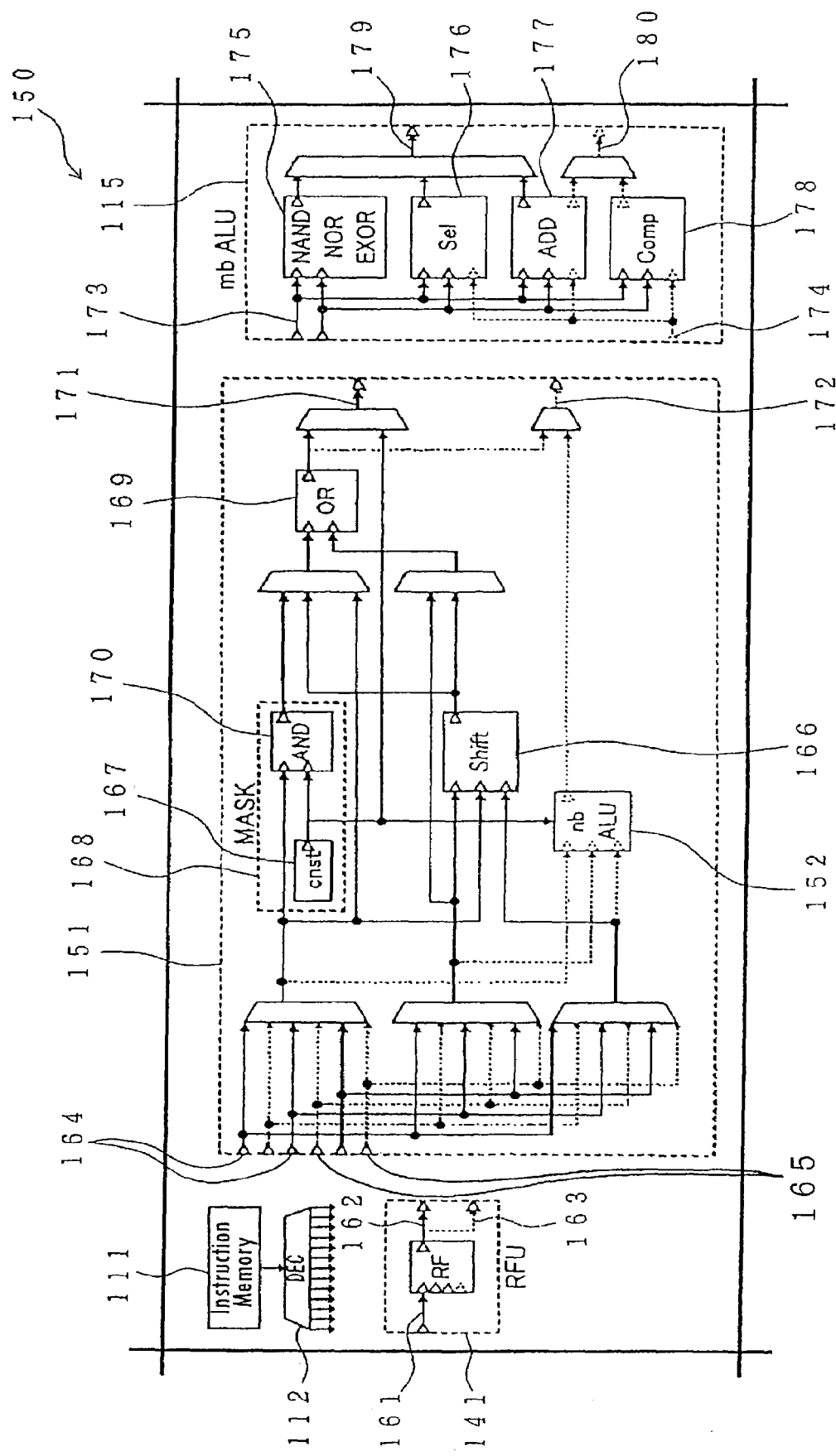
FIG. 16 is a block diagram of an internal structure of a DMU, etc. in the processing element according to the third modification.

An internal structure of processing element 150 will be described in specific detail below with reference to FIG. 16.

Register file unit 141 is arranged in an mb structure, and has one mb parallel input port 161 to which m/nb data are input and mb parallel output port 162 for outputting mb data.

Since nm output port 163 is branched from mb parallel output port 162, register file unit 141 can output m/nb data in parallel.

DMU 151 has three mb parallel input ports 164 to which m/nb data are input. Three nb input ports 165 are branched from respective input ports 164 and connected to nb ALU 152.

Three mb parallel input ports 164 are connected to a processing circuit comprising shifting circuit 166, masking circuit 168 which has numerical value holding circuit 167 and AND gate 170, and OR gate 169, etc. The processing circuit is connected to one mb parallel output port 171.

DMU 151 also has nb output port 172 parallel to mb parallel output port 171. Nb ALU 152 and OR gate 169 are connected to nb output port 172.

DMU 151 is capable of exclusively performing a process of handling mb data and nb data with masking circuit 168 and OR gate 169 and a process of processing nb data with nb ALU 152.

Since numerical value holding circuit 167 temporarily holds numerical data, numerical data can be supplied to masking circuit 168 and OR gate 169. Furthermore, because masking circuit 168 masks mb data, only certain places of mb data may be made effective, so that numerical data temporarily stored in numerical value holding circuit 167 can be used to mask data.

A specific example of processing operation of DMU 151, in which the third bit of second mb data Dm2 is input to the fourth bit of first mb data DM1 of 8 bits to generate third mb data Dm3, will be described below.

Firstly, first mb data DM1 is input from an external circuit to first processing element 150, and second mb data Dm2 is input, in parallel to first mb data DM1, from the external circuit to second processing element 150.

In DMU 151 of first processing element 150 to which first mb data DM1 is input, a masking value of masking circuit 168 which is set in an instruction code temporarily holds mb numerical data "11101111" where only the fourth bit is "0" in numerical value holding circuit 167, and the masking value and Dm1 [7:0] are masked by being ANDed by masking circuit 168. Therefore, first temporary data Tm1 (=Dm1 [7:0], 0, Dm1 [3:0]) where only the fourth bit of the first mb data is invalid is generated. In this case, the rightmost bit is the 0th bit and the leftmost bit is the seventh bit.

In second processing element 150 to which second mb data Dm2 is input, mb numerical data "00001000" where only the third bit is "1", temporarily stored by numerical value holding circuit 167, and Dm2 [7:0] are masked by masking circuit 168. Thus, second temporary data Tm2 (=0000, Dm2 [3], 000) where only the third bit of the second mb data is valid is generated.

The first temporary data Tm1 generated by first processing element 150 and the second temporary data Tm2 generated by second processing element 150 are transmitted on a real-time basis to DMU 151 of third processing element 150.

In DMU 151, Tm2 is shifted one bit to a higher place by shifting circuit 166, thus converting the third bit into the fourth bit, and third temporary data Tm3 thus generated and the first temporary data Tm1 are ORed by OR gate 169, which thus generates third mb data Dm3 (=Dm1 [7:5], Dm2 [3], Dm1 [3:0]).

As described above, DMU 151 can perform various processing processes on mb data by combining the shifting process, the masking process, and the OR operation process which are carried out by various circuits 166 through 199, and can also process nb data in combination therewith.

At this time, since mb ALU 115 can process mb data separately from DMU 151, processing elements 150 can individually perform a process of processing m/nb data with DMU 151 and a process of processing mb data with mb ALU 115, and can combine these processes.

In the above specific example, one processing task is carried out in one cycle by DMUs 151 of three processing elements 150. However, such a processing task can be carried out in three cycles by solo processing element 150.

In the above specific example, three stages of processing operation are carried out by respective three processing elements 150 for illustrative purposes. However, the processing operation of third processing element 150 may be carried out by first and second processing elements 150.

While preferred embodiments of the present invention have been described using specific terms, such description is for illustrative purposes only, and it is to be understood that changes and variations may be made without departing from the spirit or scope of the following claims.

What is claimed is:

1. An arrayed processor comprising:
a plurality of processing elements arranged in a matrix, each of said processing elements having: an instruction memory configured to store instruction codes, an instruction decoder, an mb (m-bit) arithmetic logic unit and an nb (n-bit) arithmetic logic unit, where "m" represents a natural number equal to or greater than 2 and "n" represents a natural number smaller than "m";
a plurality of switch elements interconnecting said plurality of processing elements;
a state transition controller configured to generate instruction pointers for said processing elements in response to object codes supplied to the state transition controller from an external circuit and to supply the generated instruction pointers to said respective processing elements, said generated instruction pointers designating instruction codes stored in each said instruction memory of said plurality of processing elements; and
a data distributor configured to divide a series of processing data received from an external circuit into mb data and nb data, said mb data and nb data being input selectively to certain ones of said plurality of processing elements through mb and nb buses having connections controlled by said plurality of switch elements;
wherein said instruction decoder of each said plurality of processing elements is configured to decode instruction codes designated by said instruction pointers in order to control the processing operation of said mb and nb arithmetic logic; and
wherein said mb arithmetic logic unit processes in parallel mb data from said series of processing data, and said nb arithmetic logic unit processes nb data from said series of processing data according to said object codes.

2. The arrayed processor according to claim 1, wherein said processing elements are arranged in a matrix and have a bus connector, an input control circuit, and an output control circuit,
wherein said bus connector are configured to control connections between said mb buses connected thereto and connections between said nb buses connected thereto,
said input control circuit are configured to control at least connections of input data from said mb buses to said mb arithmetic logic units and connections of input data from said nb buses to said nb arithmetic logic units, and
said output control circuits is configured to control at least connections of output data from said mb arithmetic logic units to said mb buses and connections of output data from said nb arithmetic logic unit to said nb buses.

3. The arrayed processor according to claim 1, wherein each of said processing elements has an mb register file unit for temporarily holding said mb data input thereto and outputting said mb data, and an nb register file unit for temporarily holding said nb data input thereto and outputting said nb data.

4. The arrayed processor according to claim 1, wherein each of said processing elements has a single register file unit for temporarily holding said mb data input thereto, outputting the mb data as at least one of said mb data and said nb data, temporarily holding said nb data input thereto, and outputting the nb data as at least one of said mb data and said nb data.

5. The arrayed processor according to claim 1, wherein each of said processing elements has internal interconnection resources for each of said processing elements to control connections between said mb arithmetic logic unit, said nb arithmetic logic unit, and a register file unit.

6. The arrayed processor according to claim 1, wherein each of said processing elements includes a data manipulation unit for manipulating at least said mb data and said nb data.

7. The arrayed processor according to claim 6, wherein said nb arithmetic logic unit of each of said processing elements comprises a part of said data manipulation unit.

8. The arrayed processor according to claim 6, wherein said data manipulation unit includes a shifting circuit for shifting at least said mb data.

9. The arrayed processor according to claim 6, wherein said data manipulation unit includes a numerical value holding circuit for temporarily holding numerical data for use in processing said mb data.

10. The arrayed processor according to claim 6, wherein said data manipulation unit includes a masking circuit for masking at least said mb data.

11. The arrayed processor according to claim 9, wherein said data manipulation unit includes a masking circuit for masking at least said mb data using the numerical data temporarily held by said numerical value holding circuit.

12. The arrayed processor according to claim 6, wherein said data manipulation unit includes an OR gate for performing OR operations on at least said mb data.

13. The arrayed processor according to claim 1, wherein "nb" represents 1 bit.

14. The arrayed processor according to claim 13, wherein "mb" represents 8 bits.

15. A data processing system comprising:
an arrayed processor according to claim 1;
a data processing apparatus for generating said object codes from source codes;
code supply means for supplying said source codes to said data processing apparatus; and
code transfer means for inputting said object codes output from said data processing apparatus to said arrayed processor.

16. A data processing system according to claim 15 further comprising code storage means for registering a plurality of types of said object codes.

* * * * *